(12) United States Patent
Heimann et al.

(10) Patent No.: US 6,874,758 B2
(45) Date of Patent: Apr. 5, 2005

(54) HANDLE ASSEMBLY FOR FAUCET

(75) Inventors: Bruno Heimann, Fröndenberg (DE); Christian Frankholz, Fröndenberg (DE); Matthias Schlüter, Dortmund (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 10/629,723

(22) Filed: Jul. 29, 2003

(65) Prior Publication Data

US 2004/0026648 A1 Feb. 12, 2004

(30) Foreign Application Priority Data

Aug. 8, 2002 (DE) .......................................... 102 36 572

(51) Int. Cl.[7] .............................................. F16K 31/00
(52) U.S. Cl. ...................................... 251/292; 251/291
(58) Field of Search .............................. 251/291, 292, 251/297, 355; 137/359; 4/675, 678

(56) References Cited

U.S. PATENT DOCUMENTS 4,708,318 A * 11/1987 Simo ........................ 251/292

5,826,788 A * 10/1998 Redding ..................... 251/355

FOREIGN PATENT DOCUMENTS

DE              16 75 417       1/1971

* cited by examiner

Primary Examiner—Timothy L. Maust
(74) Attorney, Agent, or Firm—Herbert Dubno; Andrew Wilford

(57) ABSTRACT

A valve stem is provided with a handle assembly having a noncircular axially extending formation and a retaining element fixed to the stem and formed with an array of axially extending and radially deflectable tongues having radially outwardly directed bumps and a screwthread of predetermined axial length axially offset from the stem formation and from the tongues. A handle having a hub formed with a hole fittable axially over the retaining element is formed inside the hole with a screwthread complementary to the retaining-element screwthread, with a handle formation complementary to and fittable axially with the stem formation and offset from the handle screwthread by a distance greater than the retaining-element screwthread axial length, and with a radially inwardly open groove. The handle fits with its hole over the element with the formations interengaged, the screwthreads not engaged, and the bumps in the groove.

10 Claims, 3 Drawing Sheets

HANDLE ASSEMBLY FOR FAUCET

FIELD OF THE INVENTION

The present invention relates to a handle for a faucet. More particularly this invention concerns a handle for a thermostatically controlled mixing valve.

BACKGROUND OF THE INVENTION

A standard handle assembly as described in German patent 1,675,417 issued Jan. 8, 1976 to E. Winterhoff fits on a valve having a stem rotatable about an axis. The assembly comprises a noncircular axially extending formation centered on the axis and fixed on the stem, a retaining element fixed to the stem and formed centered on the axis with an array of axially extending and radially deflectable tongues axially offset from the stem formation and having radially outwardly directed bumps of a predetermined diameter, and a handle having a hub formed with a hole fittable axially over the retaining element and formed inside the hole with a handle formation complementary to and fittable axially with the stem formation and with a radially inwardly open groove. The stem is a actually formed by a splined metal shaft carrying a plastic cup itself having the noncircular coupling formation. The handle fits with its hole over the element with the formations interengaged and the bumps in the groove. Thus the handle is simply snapped axially onto the stem and is retained in place by the bumps pressed radially elastically outward into the groove.

Such a system has the advantage of extreme simplicity, while still solidly angularly coupling the handle via the interfitting formations to the stem. The problem exists, however, that an axial pull on the handle can tug it right off the stem. Thus the handle can be easily pulled off the valve intentionally or accidentally.

OBJECTS OF THE INVENTION

It is therefore an object of the present invention to provide an improved handle assembly for a valve.

Another object is the provision of such an improved handle assembly for a valve which overcomes the above-given disadvantages, that is which prevents the handle from being easily separated from the stem while still making it possible to install and remove the handle when necessary.

SUMMARY OF THE INVENTION

A valve having a stem rotatable about an axis is provided with a handle assembly having according to the invention a noncircular axially extending formation centered on the axis and fixed on the stem and a retaining element fixed to the stem and formed centered on the axis with an array of axially extending and radially deflectable tongues axially offset from the stem formation and having radially outwardly directed bumps of a predetermined diameter and a screwthread of predetermined axial length axially offset from the stem formation and from the tongues and of an outside diameter at least equal to the bump diameter. A handle having a hub formed with a hole fittable axially over the retaining element is formed inside the hole with a screwthread complementary to the retaining-element screwthread, with a handle formation complementary to and fittable axially with the stem formation and offset from the handle screwthread by a distance greater than the retaining-element screwthread axial length, and with a radially inwardly open groove. The handle fits with its hole over the element with the formations interengaged, the screwthreads not engaged, and the bumps in the groove.

Thus with this system the handle is installed by fitting its hole over the stem and then rotating it to move the screwthread of the handle axially along and past the screwthread of the coupling element. The spacing of the coupling element screwthread from the stem coupling formation is such that the handle screwthread will axially pass and in fact move out of engagement with the stem screwthread before the coupling formations of the stem and handle engage each other and the bumps on the coupling element snap into the groove in the handle. As a result, if the handle is pulled axially back to disengage the coupling formations and pull the bumps out of the groove, the screwthreads will block axial withdrawal of the handle. It is then necessary to rotate and, in effect, unscrew the handle to remove it. As a result unintentional removal is impossible and, in fact, intentional removal is thwarted with regard to someone who does not know how to proceed. On the other hand, when installed the formations angularly couple the handle to the stem, and the bumps axially couple the handle to the stem.

The stem formation according to the invention includes a plurality of planar facets extending parallel to the axis. Thus the stem could simply be of, for example, hexagonal section. It is also within the scope of the invention for the stem formation to be splines capable of transmitting considerable torque.

The valve handle assembly further has according to the invention an axially extending screw threaded into the stem and bearing axially on the retaining element. This screw has a cylindrical head. The hole of the handle is formed centered on the axis with a cylindrical pocket complementarily receiving the screw head. Thus this screw, which can be a metal part solidly threaded into the metallic core of the stem, itself supports the handle so that the retaining element can be a molded plastic part.

According to the invention the handle hole has a cylindrical wall region centered on the axis. A seal ring on the stem radially engages the wall region. This prevents moisture from getting inside the handle.

The valve handle assembly further has according to the invention a mounting cup fixed rotationally on the stem and forming the stem formation. The cup and stem have complementarily interengaging coupling formations. The above-mentioned screw also extends through this mounting cup, which typically is a molded plastic part, to retain it in place on the metallic stem. To this end the screw has a shoulder bearing axially inward on the retaining element. In addition the retaining element has a central bore formed with a shoulder bearing axially outward on the shoulder of the screw.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
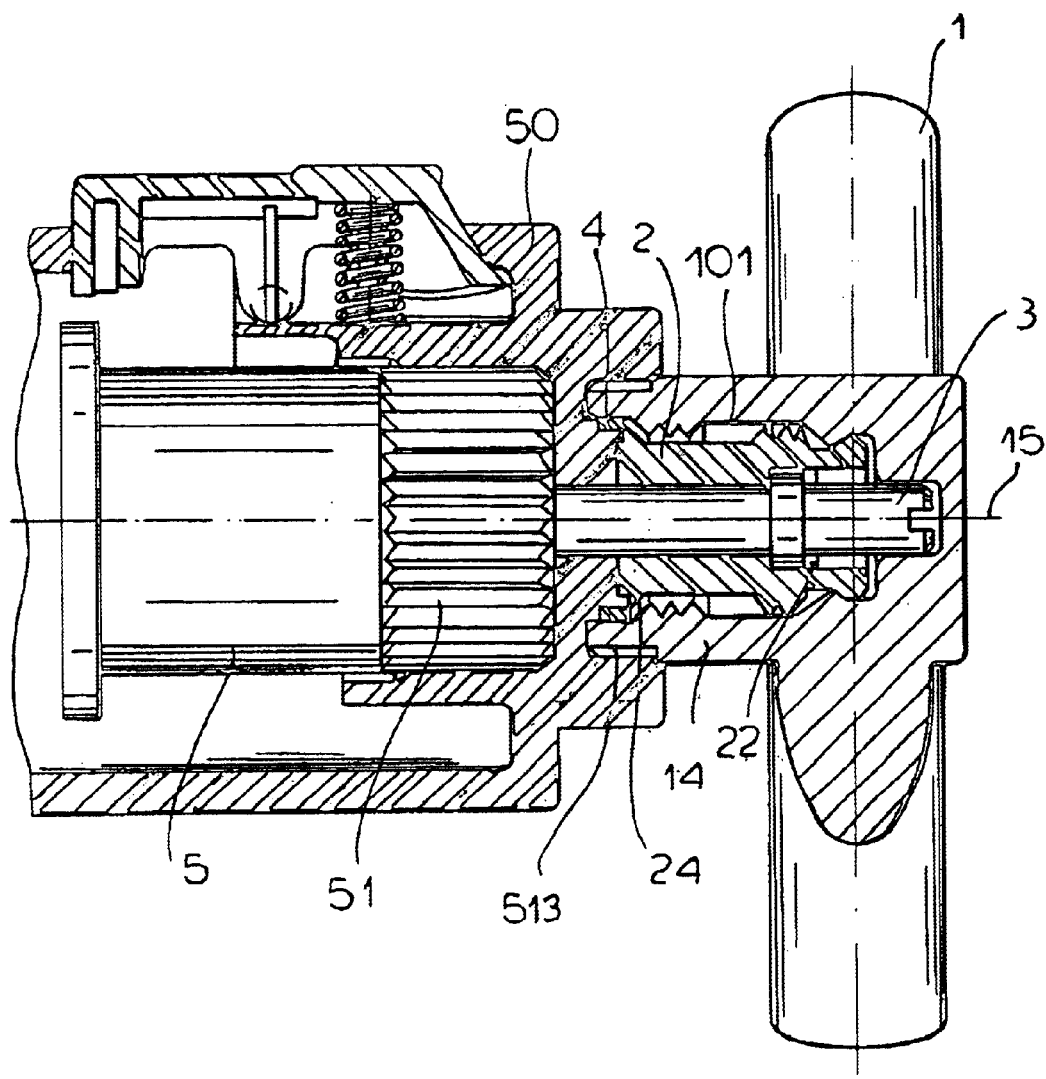
FIG. 1 is a large-scale axial section through the handle assembly according to the invention.

As seen in FIG. 1 a handle assembly according to the invention basically comprises a metal handle 1, a plastic retaining element or sleeve 2, a metal screw 3, an elastomeric O-ring 4, and a metal stem 5, all basically centered on an axis 15.

Figure 9:
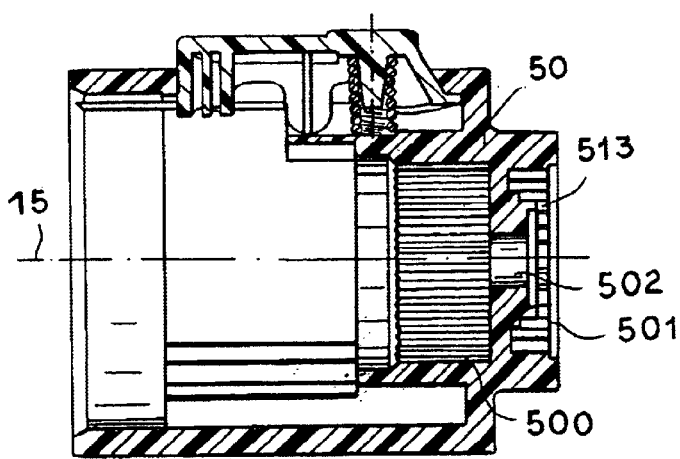
FIG. 9 is an axial section through the handle cup.

The stem 5 is connected to an unillustrated valve, e.g. a thermostatically controlled mixing valve or a simple shutoff valve, and has a splined outer end 51 on which fits a plastic mounting cup 50 (see FIG. 9) formed internally with splines 500 and with a central throughgoing hole 502 through which the screw 3 passes. In addition this cup 50 has an outwardly open and internally splined recess 513 at the outer edge of which it is formed with a radially and axially outwardly open seat or groove 501 for the O-ring 4.

Figure 5:
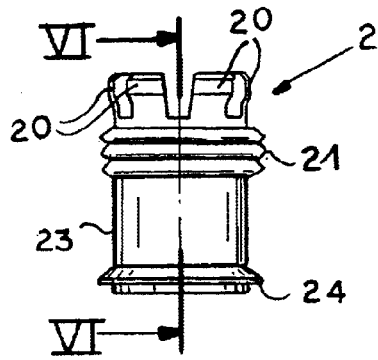
FIG. 5 is a side view of the retaining sleeve.
Figure 6:
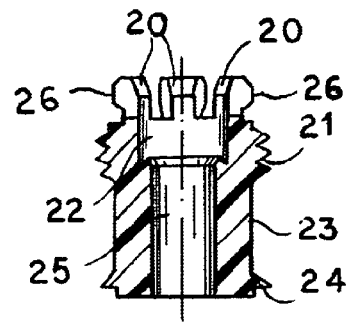
FIG. 6 is an axial section through the retaining sleeve.
Figure 7:
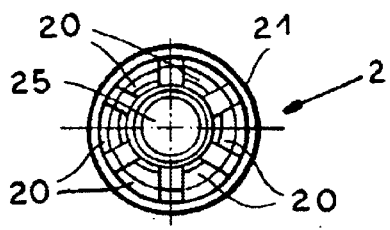
FIG. 7 is an end view of the retaining sleeve.

The retaining sleeve 2 (see FIGS. 5–7) has a central passage 25 through which the screw 3 passes and is formed with a radially outwardly open seat 22 on which a shoulder 31 of the screw 3 can bear. This sleeve 2 also has at its outer end an array of six axially outwardly extending and radially elastically deflectable tongues 20 each formed with a radially outwardly projecting bump 26. Immediately axially inward of the tongues 29 is a short screwthreaded region 21. A radially inwardly directed shoulder 24 at the inner end of the sleeve is spaced from the screwthread 21 by a cylindrical wall region 23 of an axial length equal to twice that of the screwthread 21.

Figure 8:
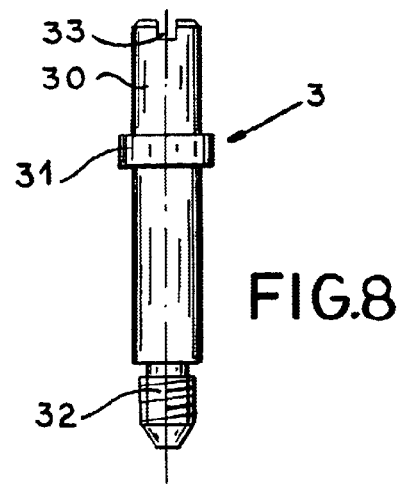
FIG. 8 is a side view of the retaining screw.

The screw 3 (see FIG. 8) has a threaded inner end 32 that fits in an unillustrated complementary blind threaded bore in the stem 5 and a cylindrical outer end 30 formed with a slot 33. This screw 3 passes through the sleeve 2 and cap 50 and bears with its shoulder 31 on the shoulder 22 of the sleeve 2 to secure the sleeve 2 and the cup 50 solidly to the stem. The splines 51 and 500 interfit to angularly lock the cup 50 to the stem 5.

Figure 2:
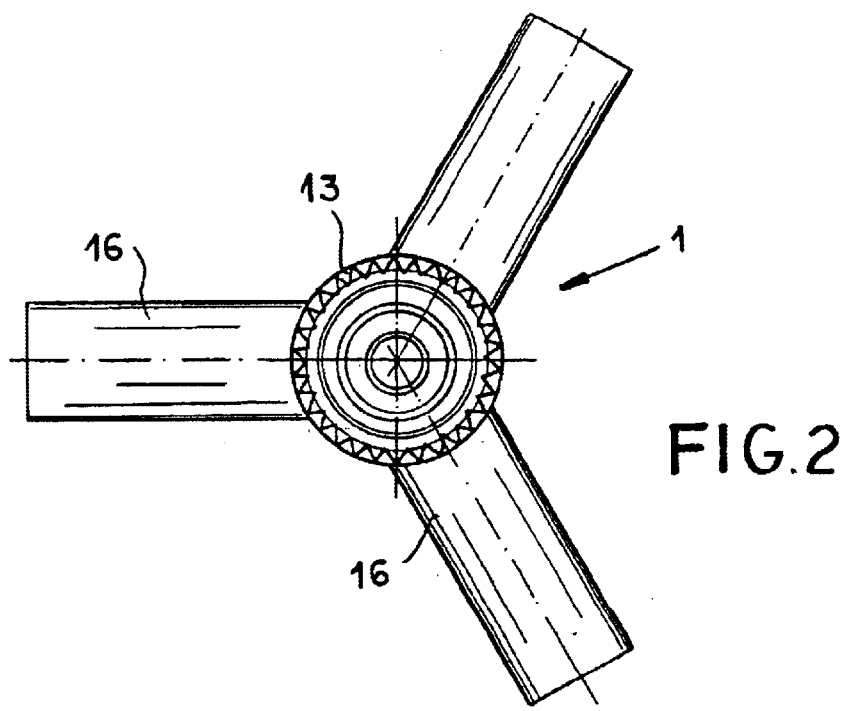
FIG. 2 is an end view of the handle.
Figure 3:
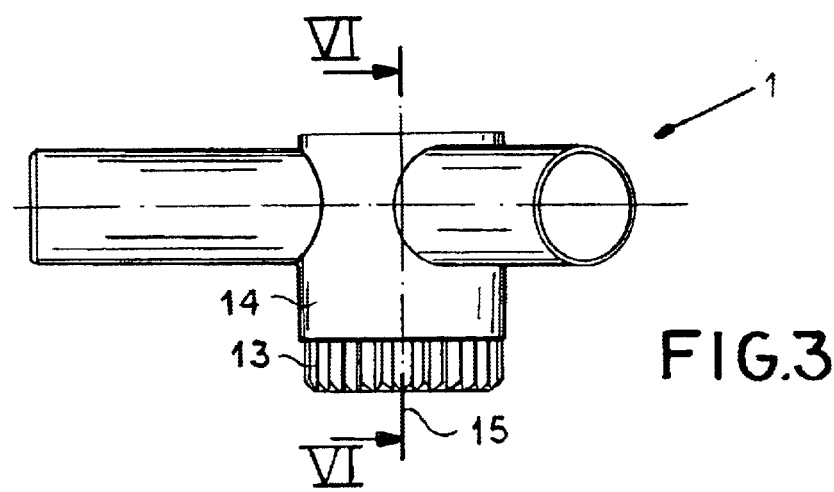
FIG. 3 is a side view of the handle.
Figure 4:
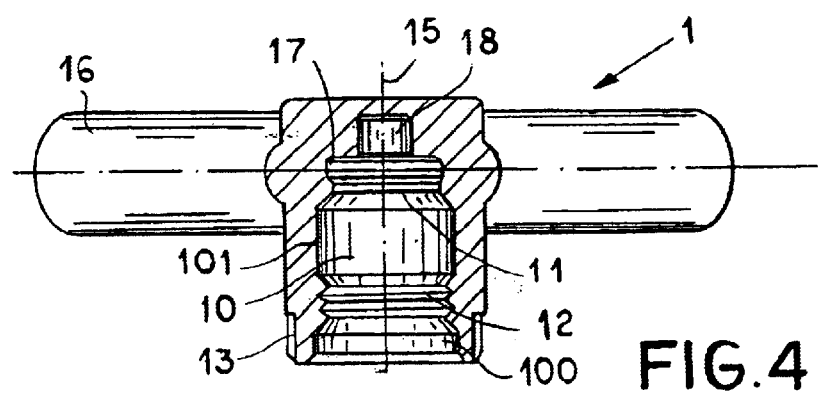
FIG. 4 is a section taken along line IV—IV of FIG. 3.

The handle 1 (see FIGS. 1–3) has a body 14 from which extend three arms 16 and which has a splined inner end 13 complementary to the splines 513 of the cup 50. In addition this body 14 is formed with a central blind hole 10 in turn formed at its mouth with a widened region 100 of cylindrical shape adapted to fit over the O-ring 4 and press it into the seat 501, with a short screwthreaded region 12 complementary to the screwthread 21, with an inner shoulder 11 forming a radially inwardly open groove 17 into which the bumps 26 can fit, and with a cylindrical inner end 18 complementary to the screw head 30. A cylindrical region 101 of relatively large diameter and a length equal to at least twice the axial length of the threaded region 21 extends between the screwthread 12 and the ridge 11.

Thus once the sleeve 2 and cap 50 are retained in place by the screw 3, with the O-ring 4 radially compressed and sealing between the sleeve 2 and cap 50, the handle 1 can be fitted over the sleeve 2 until the screwthreads 12 and 21 engage each other. The installer then rotates the handle 1 to threadedly engage the screwthreads 12 and 21 and continues the rotation until the handle screwthread 12 passes the stem screwthread 21. The axial length of the region 23 is twice that of the screwthread 21 or 12 so that the splines 13 and 513 will be out of engagement when the screwthread 12 moves axially inward past the screwthread 21. In addition the maximum diameter of the screwthread 21 is less than the inside diameter of the region 101 and the minimum diameter of the screwthread 12 is more than the outside diameter of the region 23, so that once the screwthreads 12 and 21 pass each other, the handle 1 can move freely axially on the sleeve 2.

The user then simply pushes the handle 1 axially inward, fitting the splines 13 and 513 together and camming the tongues 11 inward as the bumps 26 engage the ridge 11. The two screwthreads 12 and 21 move axially apart during this action. The bumps 26 snap into the groove 18 when the handle 11 is fully installed and the screw head 30 fits in the seat 18, providing a solid mounting for the handle 1. The handle 1 is therefore angularly coupled to the cup 50 by interengagement of the splines 13 and 513, and axially by the bumps 26 in the groove 18.

Removing the handle 1 is the reverse operation: It is first pulled axially outward (to the right in FIG. 1), and then the screwthread 12 is threaded to the screwthread 21 until it is completely past it, whereupon the handle 1 is completely free and can be separated.

Of course, if the handle 1 is accidentally or intentionally pulled axially outward, it will move axially until the screwthreads 12 and 21 collide. Thus the handle 1 will not fall off, and if the movement was accidental, it can be remounted simply by pushing it axially back into place. In fact, unless a person is acquainted with how the handle 1 is supposed to be removed, it is unlikely that he or she will be able to remove it readily, so the structure of this invention provides a low-level of vandalism prevention.

We claim:

1. In combination with a valve having a stem rotatable about an axis, a handle assembly comprising:

a noncircular axially extending formation centered on the axis and fixed on the stem;

a retaining element fixed to the stem and formed centered on the axis with
      an array of axially extending and radially deflectable tongues axially offset from the stem formation and having radially outwardly directed bumps of a predetermined diameter, and
      a screwthread of predetermined axial length axially offset from the stem formation and from the tongues and of an outside diameter at least equal to the bump diameter; and a handle having a hub formed with a hole fittable axially over the retaining element and formed inside the hole with
      a screwthread complementary to the retaining-element screwthread,
      a handle formation complementary to and fittable axially with the stem formation and offset from the handle screwthread by a distance greater than the retaining-element screwthread axial length, and
      a radially inwardly open groove, the handle fitting with its hole over the element with the formations interengaged, the screwthreads not engaged, and the bumps in the groove.

2. The valve handle assembly defined in claim 1 wherein stem formation includes a plurality of planar facets extending parallel to the axis.

3. The valve handle assembly defined in claim 2 wherein the stem formation is splines.

4. The valve handle assembly defined in claim 1, further comprising
   an axially extending screw threaded into the stem and bearing axially on the retaining element.

5. The valve handle assembly defined in claim 4 wherein the screw has a cylindrical head, the hole of the handle being formed centered on the axis with a cylindrical pocket complementarily receiving the screw head.

6. The valve handle assembly defined in claim 1 wherein the handle hole has a cylindrical wall region centered on the axis, the assembly further comprising a seal ring on the stem and radially engaging the wall region.

7. The valve handle assembly defined in claim 1, further comprising a mounting cup fixed rotationally on the stem and forming the stem formation, the cup and stem having complementarily interengaging coupling formations.

8. The valve handle assembly defined in claim 7, further comprising an axially extending screw threaded into the stem, bearing axially on the retaining element and extending through an end wall of the cup.

9. The valve handle assembly defined in claim 8 wherein the screw has a shoulder bearing axially inward on the retaining element.

10. The valve handle assembly defined in claim 9 wherein the retaining element has a central bore formed with a shoulder bearing axially outward on the shoulder of the screw.

* * * * *